US012544025B2

(12) United States Patent
Lazarev et al.

(10) Patent No.: US 12,544,025 B2
(45) Date of Patent: Feb. 10, 2026

(54) DETERMINING A BIOLOGICAL TISSUE STRUCTURAL MARKER FOR DIAGNOSIS OF A DISEASE

(71) Applicant: Arion Diagnostics, Inc., Petaluma, CA (US)

(72) Inventors: Alexander P. Lazarev, Lake Forest, CA (US); Delvin Tai Wai Yuk, Atherton, CA (US); Pavel Lazarev, Box Elder, SD (US)

(73) Assignee: Arion Diagnostics, Inc., Petaluma, CA (US)

( * ) Notice: Subject to any disclaimer, the term of this patent is extended or adjusted under 35 U.S.C. 154(b) by 498 days.

(21) Appl. No.: 18/298,228

(22) Filed: Apr. 10, 2023

(65) Prior Publication Data

US 2023/0240636 A1    Aug. 3, 2023

Related U.S. Application Data

(63) Continuation of application No. 17/593,846, filed on Sep. 26, 2021, now Pat. No. 11,607,188, and a
(Continued)

(51) Int. Cl.
*A61B 6/00* (2024.01)
*A61B 6/46* (2024.01)
(Continued)

(52) U.S. Cl.
CPC .............. *A61B 6/502* (2013.01); *A61B 6/467* (2013.01); *A61B 6/563* (2013.01); *G06T 7/0012* (2013.01);
(Continued)

(58) Field of Classification Search
CPC ......... A61B 6/467; A61B 6/502; A61B 6/563; A61B 2576/00; A61B 5/0071;
(Continued)

(56) References Cited

U.S. PATENT DOCUMENTS 5,479,927 A    1/1996  Shmulewitz
5,717,733 A    2/1998  Kurbatov et al.
(Continued)

FOREIGN PATENT DOCUMENTS

CN    112951416 A    6/2021
CN    113012823 A    6/2021
(Continued)

OTHER PUBLICATIONS

European Search Report dated May 24, 2024 for European Patent Office Patent Application No. 21826535.3.
(Continued)

*Primary Examiner* — Jon Eric C Morales
(74) *Attorney, Agent, or Firm* — MLO, a professional corp.

(57) ABSTRACT

The present disclosure relates to determining a biological tissue structural marker for diagnosis of a disease using a biological tissue characterization technique. A method for determining a structural marker for a diagnosis of a disease can include measuring a first molecular structure of a biological tissue of a first population of animals, after a carcinogenic or pathogenic substance was introduced into the first population. A second molecular structure of the biological tissue of a second population of animals can be measured, wherein the second population did not receive the carcinogenic or pathogenic substance. A first and a second structural marker of the molecular structures of the biological tissue of the first and second populations, respectively, can be identified and compared to determine that the first structural marker is indicative that the biological tissue of the first population of animals was affected by the disease.

22 Claims, 4 Drawing Sheets

Related U.S. Application Data continuation-in-part of application No. 17/448,888, filed as application No. PCT/US2021/037224 on Jun. 14, 2021, now Pat. No. 11,751,828.

(60) Provisional application No. 63/039,345, filed on Jun. 15, 2020.

(51) Int. Cl.

| | | |
|---|---|---|
| *A61B 6/50* | (2024.01) | |
| *G06T 7/00* | (2017.01) | |
| *G16H 20/40* | (2018.01) | |
| *G16H 30/20* | (2018.01) | |
| *G16H 40/63* | (2018.01) | |
| *G16H 40/67* | (2018.01) | |
| *G16H 50/20* | (2018.01) | |

(52) U.S. Cl.
CPC .............. *G16H 20/40* (2018.01); *G16H 30/20* (2018.01); *G16H 40/63* (2018.01); *G16H 40/67* (2018.01); *G16H 50/20* (2018.01); *G06T 2207/10116* (2013.01); *G06T 2207/30068* (2013.01)

(58) Field of Classification Search
CPC ... A61B 5/0075; A61B 5/0077; A61B 5/0082; A61B 5/444; A61B 5/4839; A61B 5/4848; A61B 5/7257; A61B 5/7275; A61B 6/48; A61B 6/50; A61B 6/508; A61B 6/5217; G06T 2207/10116; G06T 2207/30068; G06T 7/0012; G06T 2207/30096; G06T 7/0016; G16H 30/20; G16H 20/40; G16H 50/20; G16H 30/40; G01N 2223/6126

See application file for complete search history.

(56) References Cited

U.S. PATENT DOCUMENTS

| | | |
|---|---|---|
| 5,849,595 A | 12/1998 | Alfano et al. |
| 6,175,117 B1 | 1/2001 | Komardin et al. |
| 6,483,891 B1 | 11/2002 | Lazarev et al. |
| 9,529,974 B2 | 12/2016 | Li et al. |
| 2003/0014418 A1 | 1/2003 | Adler et al. |
| 2003/0135096 A1 | 7/2003 | Dodds |
| 2006/0015265 A1 | 1/2006 | Raich |
| 2007/0032832 A1 | 2/2007 | Feher |
| 2013/0208966 A1 | 8/2013 | Zhao et al. |
| 2015/0269323 A1 | 9/2015 | Ginsburg |
| 2016/0203263 A1 | 7/2016 | Maier et al. |
| 2016/0235372 A1 | 8/2016 | Schneider et al. |
| 2017/0362585 A1 | 12/2017 | Wang et al. |
| 2018/0038845 A1 | 2/2018 | Zimmermann et al. |
| 2018/0122499 A1 | 5/2018 | Austin et al. |
| 2019/0113451 A1 | 4/2019 | Weissleder et al. |
| 2020/0098476 A1 | 3/2020 | Loscutoff et al. |
| 2020/0160980 A1 | 5/2020 | Lyman et al. |
| 2022/0008027 A1 | 1/2022 | Lazarev et al. |
| 2022/0013227 A1 | 1/2022 | Lazarev et al. |
| 2022/0013233 A1 | 1/2022 | Lazarev et al. |
| 2022/0399126 A1 | 12/2022 | John et al. |
| 2022/0415505 A1 | 12/2022 | Lazarev et al. |
| 2023/0113064 A1 | 4/2023 | Yuk et al. |
| 2023/0240635 A1 | 8/2023 | Lazarev et al. |
| 2023/0270396 A1 | 8/2023 | Lazarev et al. |
| 2023/0341340 A1 | 10/2023 | Lazarev et al. |
| 2024/0000412 A1 | 1/2024 | Lazarev et al. |
| 2024/0016462 A1 | 1/2024 | Lazarev et al. |
| 2024/0161893 A1 | 5/2024 | Lazarev et al. |
| 2025/0149170 A1 | 5/2025 | Lazarev et al. |

FOREIGN PATENT DOCUMENTS

| | | |
|---|---|---|
| KR | 20180076702 A | 7/2018 |
| WO | 2004071295 A1 | 8/2004 |
| WO | 2013131156 A1 | 9/2013 |
| WO | 2018081884 A1 | 5/2018 |
| WO | 2021257451 A1 | 12/2021 |
| WO | 2021257457 A1 | 12/2021 |

OTHER PUBLICATIONS

Arboleda et al, Assessing lesion malignancy by scanning small-angle X-ray scattering of breast tissue with microcalcifications, Phys Med Biol. Aug. 7, 2019;64(15):155010, pp. 1-9.

Chapman et al., Diffraction enhanced x-ray imaging, Phys. Med. Biol. 42, Nov. 1997, pp. 2015-2025.

Conceicao et al., Analysis of breast cancer by small angle X-ray scattering (SAXS), Analyst, Apr. 2009 134 (6):1077-82.

Frolov et al., "Risk stratification personalised model for prediction of life-threatening ventricular tachyarrhythmias in patients with chronic heart failure," Kardiologia Polska Mar. 2017; 75, 7: 682-688; DOI: 10.5603/KP.a2017.0060.

Ghiculescu, "Therapeutic drug monitoring: which drugs, why, when and how to do it", Australian Prescriber, vol. 31, No. 2, Apr. 2008, pp. 42-44.

James, "Fiber diffraction of skin and nails provides an accurate diagnosis of malignancies", Int. J. Cancer: 125, Feb. 2009, pp. 133-138.

Lazarev et al., "Human Tissue X-ray Diffraction: Breast, Brain, and Prostate", Proceedings of the 22nd Annual International Conference of the IEEE Engineering in Medicine and Biology Society, Cat. No. 00CH37143, vol. 4, Jul. 2000, pp. 3230-3233.

Moss et al., Correlation of X-ray diffraction signatures of breast tissue and their histopathological classification, Scientific Reports, Oct. 2017, pp. 1-9.

Notice of Allowance and Fees dated Feb. 6, 2023 for U.S. Appl. No. 17/593,846.

Notice of Allowance and Fees dated Jul. 19, 2023 for U.S. Appl. No. 17/448,888.

Office Action dated Mar. 22, 2023 for U.S. Appl. No. 17/448,888.

Oliver et al., Diffraction enhanced imaging utilizing a laser produced x-ray source, Rev. Sci. Instrum. 93, 093502, Sep. 2022, 7 pages.

Ortin et al., "Automated real-time method for ventricular heartbeat classification," Computer Methods and Programs in Biomedicine 169 (2019) Nov. 1-8, 2018, 8 pages.

Korean Intellectual Property Office, "International Search Report" in connection with related International Application No. PCT/US2021/037238, dated Oct. 5, 2021, 5 pgs.

Korean Intellectual Property Office, Written Opinion of the InternationalSearching Authority in connection with related International Application No. PCT/US2021/037238, dated Oct. 5, 2021, 5 pgs.

Commissioner for Patents, "International Search Report" in connection with related International Application No. PCT/US2021/037224, dated Sep. 29, 2021, 3 pgs.

Commissioner for Patents, Written Opinion of the International Searching Authority in connection with related International Application No. PCT/US2021/037224, dated Sep. 29, 2021, 6 pgs.

Round et al., A preliminary study of breast cancer diagnosis using laboratory based small angle x-ray scattering, Phys Med Biol. Sep. 2005, 50(17):4159-68.

Sidhu et al., Mapping structural changes in breast tissue disease using x-ray scattering, Medical Physics 36, May 2009, pp. 3211-3217.

Wang et al., "A High Precision Real-time Premature Ventricular Contraction Assessment Method based on the Complex Feature Set," Journal of Medical Systems (2020) 44:3, published Nov. 2019, 16 pages.

Wu et al., "ECG signal classification with binarized convolutional neural network," Computers in Biology and Medicine 121, 103800, May 2020, 9 pages.

(56) References Cited

OTHER PUBLICATIONS

Yoneyama et al., Fast diffraction-enhanced imaging using continuous sample rotation and analyzer crystal scanning, J Synchrotron Radiat, Mar. 2020, pp. 468-471.
Zheng et. al., "Recent advances in drug release monitoring", Nanophotonics, 8(3), Feb. 2009, pp. 391-413.
Ahmadian et al., "Monitoring of drug resistance towards reducing the toxicity of pharmaceutical compounds: Past, present and future", Journal of Pharmaceutical and Biomedical Analysis, Mar. 19, 2020, 12 pgs.
Alfenaar, et al., "Therapeutic Drug Monitoring in Non Tuberculosis Mycobacteria Infections", Clinical Pharmacokinetics, Mar. 10, 2021, 15 pgs.
Buclin et al., "The Steps to Therapeutic Drug Monitoring: A Structured Approach Illustrated With Imatinib", Frontiers in Pharmacology, vol. 11, Article 177, Mar. 3, 2020, 10 pgs.
Iacuzzi et al., "Dried Blood Spot Technique Applied in Therapeutic Drug Monitoring of Anticancer Drugs: a Review on Conversion Methods to Correlate Plasma and Dried Blood Spot Concentrations", Pharm Res, Springer, Apr. 12, 2021, 20 pgs.
James, "A Review of Low Angle Fibre Diffraction in the Diagnosis of Disease", British Journal of Medicine & Medical Research, 3(2): 383-397, Feb. 19, 2013.
James, "Fiber diffraction of skin and nails provides an accurate diagnosis of malignancies", Int. J. Cancer: 125, 133-138, 13 pages, Jul. 2009.
Kuwayama et al., "Time-course measurements of drug concentrations in hair and toenails after single administrations of pharmaceutical products", Drug Testing and Analysis, Jun. 24, 2016, 7 pgs, John Wiley & Sons, Ltd.
Lupien et al., "Effects of stress throughout the lifespan on the brain, behaviour and cognition", Focus on Stress, Jun. 2009, 12 pgs, Macmillan Publishers Limited.
Ong et al., "Optical biosensors—Illuminating the path to personalized drug dosing", Biosensors and Bioelectronics, May 13, 2021, 21 pgs.
Ortiz et al., "Biomarkers of disease in human nails: a comprehensive review", Critical Reviews in Clinical Laboratory Sciences, Oct. 7, 2021, 18 pgs, Taylor & Francis Group.
Todd et al., "Survival in dementia and predictors of mortality: a review", International Journal of Geriatric Psychiatry, Mar. 2013, 16pgs, John Wiley & Sons, Ltd.
Visser, "Techniques for Monitoring Drug Efficacy", Vet Clin North Am Exot Anim Pract., 21(2), May 2018, 287-295, 2018, 7pgs.
Wallenburg et al., "Personalised antimicrobial dosing: standing on the shoulders of giants", International Journal of Antimicrobial Agents, Sep. 2020, 18 pgs.
Wiencek, et al., "Rapid Assessment of Drugs of Abuse", Advances in Clinical Chemistry, Dec. 2016, 33 pgs, Elsevier Inc., Nashville, TN.
Office Action dated Apr. 8, 2025 for U.S. Appl. No. 18/500,624.
Office Action dated Jun. 16, 2025 for U.S. Appl. No. 18/298,190.
Office Action dated Jun. 16, 2025 for U.S. Appl. No. 18/298,218.
Office Action dated Jun. 3, 2025 for U.S. Appl. No. 18/500,604.
European Search Report dated Dec. 4, 2024 for United Kingdom Patent Application No. 2410187.5.
European Search Report dated Dec. 5, 2024 for United Kingdom Patent Application No. 2410185.9.
International Search Report and Written Opinion dated Jan. 17, 2025 for PCT Patent Application No. PCT/IB2024/059571.
International Search Report and Written Opinion dated Jan. 23, 2025 for PCT Patent Application No. PCT/IB2024/060284.
International Search Report and Written Opinion dated Jan. 23, 2025 for PCT Patent Application No. PCT/IB2024/060286.
International Search Report and Written Opinion dated Jan. 31, 2025 for PCT Patent Application No. PCT/IB2024/060287.
Fagundes et al., "Structural characterization of canine mammary tissue by x-ray diffraction", Radiation Physics and Chemistry, vol. 155, pp. 22-25. (Year: 2019).
Ghammraoui et al., "Maximum-likelihood estimation of scatter components algorithm for x-ray coherent scatter computed tomography of the breast", Physics in Medicine & Biology, vol. 61, pp. 3164-3179. (Year: 2016).
Graewet et al., "Impact and progress in small and wide angle X-ray scattering (SAXS and WAXS)", Current Opinion in Structural Biology, vol. 23, pp. 748-754. (Year: 2013).
Office Action dated Feb. 26, 2024 for U.S. Appl. No. 17/448,886.
Notice of Allowance and Fees dated May 20, 2024 for U.S. Appl. No. 17/448,886.
Office Action dated Jul. 25, 2025 for U.S. Appl. No. 18/352,085.
Office Action dated Jul. 25, 2025 for U.S. Appl. No. 18/352,094.
Office Action dated Oct. 9, 2025 for U.S. Appl. No. 18/298,218.

DETERMINING A BIOLOGICAL TISSUE STRUCTURAL MARKER FOR DIAGNOSIS OF A DISEASE

RELATED APPLICATIONS

This application is a continuation-in-part of U.S. patent application Ser. No. 17/448,888, filed Sep. 26, 2021, and entitled "Diffractometer-Based Global In Situ Diagnostic System"; which is a continuation of U.S. patent application Ser. No. 17/593,846, filed Sep. 26, 2021, and entitled "Diffractometer-Based Global In Situ Diagnostic System"; which is a 371 U.S. national phase application of International Application No. PCT/US2021/037224, filed on Jun. 14, 2021, and entitled "Diffractometer-Based Global In Situ Diagnostic System"; which claims priority to U.S. Provisional Patent Application No. 63/039,345, filed on Jun. 15, 2020, and entitled "Diffractometer-Based Global In Situ Diagnostic System"; which are hereby incorporated by reference for all purposes.

BACKGROUND

Non-invasive biological tissue characterization techniques, for example low angle fiber X-ray diffraction techniques, have been used to measure tissue samples in humans to identify different types of cancer. For example, fiber diffraction patterns of skin or fingernails, using X-ray sources, have been used in biometric diagnostic methods. Such techniques have produced characteristic diffraction patterns which were distinctive and reproducible for tissue affected by a number of cancers including breast cancer, prostate cancer, colon cancer and melanoma.

SUMMARY

The present disclosure relates to determining a biological tissue structural marker for diagnosis of a disease. In some embodiments, a method for determining a structural marker for a diagnosis of a disease comprises introducing a carcinogenic or pathogenic substance into a first population of animals, wherein the carcinogenic or pathogenic substance is intended to cause the first population of animals to contract a disease that affects a molecular structure of a biological tissue of the first population of animals; and measuring a first molecular structure of the biological tissue of the first population of animals, after the carcinogenic or pathogenic substance was introduced into the first population of animals, using a biological tissue characterization technique. The method further comprises measuring a second molecular structure of the biological tissue of a second population of animals using the biological tissue characterization technique, wherein the second population of animals did not receive the carcinogenic or pathogenic substance. The method further comprises identifying a first structural marker of the first molecular structure of the biological tissue of the first population of animals; identifying a second structural marker of the second molecular structure of the biological tissue of the second population of animals; and comparing the first structural marker with the second structural marker. The method further comprises determining that the first structural marker is indicative that the biological tissue of the first population of animals was affected by the disease.

DEFINITIONS

As used herein, the term "structural marker" refers to a measured feature of a molecular structure of a biological tissue. The presence of the structural marker in a measurement of a molecular structure of a biological tissue can indicate the presence of one or more diseases, or that a particular disease process has occurred. The structural marker can be measured using a biological tissue characterization technique, such as X-ray diffraction. Structural markers, once identified, can be used in the diagnosis of various diseases such as cancers, cardiovascular diseases, skin diseases, urological diseases, diseases of the respiratory tract, and others.

As used herein, the term "non-invasive observation" or "non-invasive biological tissue characterization" of a patient refers an observation or characterization technique that does not include the introduction of instruments into the body of a patient. For example, non-invasive observation or characterization can exclude blood sampling and the introduction of pathogenic viruses and bacteria into the body. Non-invasive observation or characterization can advantageously spare the patient from pain. In some cases, non-invasive observation or characterization can eliminate radiation exposure to the body.

As used herein, the term "biological tissue" or "biological tissue sample" generally refers to tissue (or tissue samples) of a patient. For example, biological tissue can include materials of living organs that contain structural molecular components and functional components like cells, muscles, and skin, as well as detachable structures like hair, nail, skin, wool, horns, claws, or pelt. In some cases, biological tissue can contain biological molecular structures such as collagens, keratins and glycoproteins that diffract X-ray light.

As used herein, the term "X-ray tissue diffractometer" generally refers to a diffractometer configured to record diffraction data from one or more tissue sites including structural and functional molecular structures, for example sites in cells, skin and hair.

As used herein, the term "cancer" generally refers to a proliferative disorder caused or characterized by a proliferation of cells which have lost susceptibility to normal growth control. Cancers of the same tissue type usually originate in the same tissue and may be divided into different subtypes based on their biological characteristics. In some cases, malignant tumors (cancer) can be further classified according to morphological characteristics, such as: a) epithelial (papillomas, adenomas, carcinomas, cysts, dermatomas); b) connective tissue (fibroids, myxomas, lipomas, chondromas, osteomas, melanosarcomas); c) nervous tissue (gliomas, neurinomas, meningiomas); d) muscle (fibroids, rhabdomyomas); e) vascular (hemangiomas and lymphangiomas); f) mixed (osteosarcomas and fibromyxochondroma, fibrochondroosteoma).

As used herein, the term "recognition of objects" or "object recognition" generally refers to a field of computer vision wherein objects are found and/or identified in an image (or one or more images from a video sequence).

As used herein, the term "image segmentation" refers to a procedure used in digital image processing and computer vision wherein a digital image is partitioned into multiple image segments, also known as image regions or image objects (i.e., sets of pixels). Image segmentation can simplify and/or change the representation of an image into something that is more meaningful and easier to analyze. Image segmentation can be used to locate objects and boundaries (lines, curves, etc.) in digital images. In some cases, image segmentation can include assigning a label to every pixel in a digital image such that pixels with the same label share certain characteristics.

As used herein, the term "target disease" or "disease" refers to a disease that can affect a molecular structure of a biological tissue. A structural marker for the disease (or target disease) describes a measured feature of a molecular structure of the biological tissue affected by the disease. The structural marker can be used to detect the presence of the target disease in diseased tissue, and/or to diagnose the target disease in a patient. The disease can be caused by a carcinogenic or pathogenic substance. Some examples of diseases are melanoma, breast, colon, and prostate cancers and Alzheimer's disease. Other examples of diseases include diseases of the immune system, rheumatic diseases, cancer, or diseases of one or more of the: skin, stomach, liver, rectum, colon, esophagus, pancreas, bladder, vagina, lung, oropharynx, nasopharynx, oral mucosa, tongue, brain, thyroid, prostate, breast, cervix, ovary, urological organs, endocrine organs, veins, lymph nodes, mammary glands, respiratory organs, digestive organs, heart, blood vessels, colon, car, throat, or nose.

As used herein, the term "animal" generally refers to a non-human living organism. Some examples of animals are non-human mammals such as dogs, cats, rats, mice, rabbits, guinea pigs, hamsters, and monkeys, and non-mammals such as birds, reptiles and amphibians.

As used herein, the term "laboratory animals" generally refers to animals that are bred for laboratory experiments. Some examples of laboratory animals are rabbits, guinea pigs, white rats, gray rats, white mice, gray mice, and golden hamsters. Laboratory animals can be bred to study various biological systems, such as the nervous system, metabolism and digestion, reproduction, hormones, and the immune system, as well as various conditions, such as cancer, cardiovascular diseases, and mental health disorders. Laboratory animals can also be bred to determine a structural marker for a diagnosis of a disease.

As used herein, the term "carcinogenic substance" refers to any substance, radionuclide, or radiation that promotes carcinogenesis (i.e., the formation of cancer). In some cases, the carcinogenic substance can damage the genome or disrupt cellular metabolic processes. Carcinogenic substances can be radioactive substances, and/or emitted gamma rays and/or alpha particles. Carcinogenic substances can also be non-radioactive carcinogens, such as inhaled asbestos, certain dioxins, and tobacco smoke. Carcinogenic substances can be naturally occurring or synthetic substances that promote carcinogenesis.

As used herein, the term "pathogenic substance" refers to a substance that contains a pathogen (e.g., a virus or bacterium) which can cause a disease in a biological organism. For example, a pathogenic substance can include the *Helicobacter pylori* hepatitis B virus, or the hepatitis C virus.

DETAILED DESCRIPTION

The present disclosure provides a method for identifying a structural marker for a diagnosis of a disease including measuring a molecular structure of a biological tissue using a biological tissue characterization technique. In some cases, the biological tissue can be collagens, keratins, lipids, actin, myosin, or glycoproteins that diffract X-rays. In some cases, the measured data can be analyzed using digital image processing, for example including pattern recognition and the recognition of objects in X-ray diffraction images. A structural marker can describe a feature of the measured data of the molecular structure of the biological tissue, and the structural marker can be used to differentiate between healthy biological tissue and biological tissue that has been affected by the disease.

X-ray diffraction systems and methods for characterizing biological tissue samples are further described in U.S. patent application Ser. Nos. 17/593,846, 17/448,888, which are hereby incorporated by reference in their entireties.

The methods and systems described herein use biological tissue characterization techniques to measure molecular structures of biological tissues of animals. Such measurements (or studies) can be performed in order to determine, for example, a structural marker that is indicative of the tissue being infected with the disease. The information gained from such measurements (or studies) can be used to direct the course of improved treatment protocols, for both animal and human patients. These structural markers can also be used as a means of early detection of a disease (e.g., a commonly occurring cancer), or alternatively, as an indicator that the disease which has previously been diagnosed for a particular patient has been cured.

Early diagnoses of malignancies have been shown to correlate with better prognoses. However, for many malignancies there are no readily available, non-invasive, cost-effective diagnostic tests, and patients with malignancies often present too late for effective treatment. Fiber diffraction patterns of skin or fingernails, using X-ray sources, have been used in biometric diagnostic methods to detect neoplastic disorders such as melanoma, breast cancer, colon cancer, and prostate cancer.

The systems and methods described herein enable the development of low-cost, non-invasive, reliable diagnostic tests, for example that can be conducted on a regular basis in local radiology facilities. In the systems and methods described herein, a structural marker that is indicative of a disease can be developed from molecular structure measurement data of a biological tissue. A developed structural marker can be used in a diagnostic test to measure the biological tissue of a patient to screen for the disease. Such systems and methods therefore enable the early detection of the disease in the patient. In some cases, the tests developed can be confirmatory tests for other diagnostic procedures, or can be mass screening tests using suitable small angle X-ray beam-lines at synchrotrons.

The systems and methods described herein can use two groups (or populations) of laboratory animals to determine a structural marker for a disease. The first and the second group (or population) can each contain from 1 to 1000 animals, or from 1 to 100 animals, or from 1 to 10 animals, or from 10 to 1000 animals. Carcinogenic and/or pathogenic substances intended to cause a disease (or target disease) are introduced (e.g., injected, inhaled, or in the case or radiation, exposed) into laboratory animals of the first group in order to induce the target disease (e.g., in a predetermined animal organ). The second group of laboratory animals is a control group that does not receive carcinogenic/pathogenic substances. Subsequently, either invasive or non-invasive biological tissue characterization techniques are used to observe (or observe changes in, e.g., physiological and/or pathological changes in) the molecular structure of biological tissue of the laboratory animals in both groups. In some cases, in vivo measurements of tissue samples can be performed (e.g., at one time, or at a plurality of times, or during the entire period of the disease) using X-ray diffraction and/or spectroscopic analysis techniques. In other cases, tissue samples (e.g., hair, claws, or an internal organ such as brain tissue if the animal is sacrificed) can be taken (e.g., after a certain period of time, or at a plurality of times, or at different stages of the disease) and in vitro measurements of tissue samples can be performed, wherein the molecular structure of the biological tissue sample of the animal affected by the target disease can be measured (e.g., using X-ray diffraction and/or spectroscopic analysis techniques). In some cases, in vivo measurements can also measure the molecular structure of the biological tissue (e.g., cars, or an internal organ) of the animal affected by the target disease, for example, using X-rays that penetrate into the organ. In some cases, the molecular structure of biological tissue of animals in the control group is observed by conducting in vivo (or in vitro) studies of tissue samples using X-ray diffraction and spectroscopic analysis which provide a starting point (or reference point, or determination of the molecular structure of normal tissue) which is used for comparison with the molecular structure of animals with the induced target disease. In some cases, the molecular structure of biological tissue of laboratory animals in the control group is observed over time (in vivo or in vitro) to compare the change in molecular structure over time in the control group with that of the first group of laboratory animals.

Some diseases lead to characteristic changes in the molecular structure of collagen, keratin and glycoproteins of biological tissues (e.g., human and animal biological tissues). For example, the distance (or average distance) between collagen and/or keratin fibrils may change under the influence of a disease (e.g., a disease can cause a larger difference in distance between collagen and/or keratin fibrils compared to that of healthy tissue). Moreover, in some cases, the severity of a disease and/or the stage of the disease can impact the distance between collagen and/or keratin fibrils (e.g., a more advanced disease can cause a larger difference in distance between collagen and keratin fibrils compared to that of a less advanced disease). In some cases, the periodicity (or average periodicity) of collagen and/or keratin fibrils may change under the influence of a disease (e.g., a disease can cause less periodicity of collagen and/or keratin fibrils compared to that of healthy tissue). Moreover, in some cases, the severity of a disease and/or the stage of the disease can impact the periodicity of collagen and/or keratin fibrils (e.g., a more advanced disease can cause less periodicity of collagen and/or keratin fibrils compared to that of a less advanced disease). The structural markers described herein, can therefore provide indicators that can be used to diagnose diseases in patients by measuring the molecular structure of biological collagen, keratin and/or glycoproteins of the patients. In some cases, the structural marker enables the determination of the stage of the disease, for example, according to the degree of deviation of the pathologically altered molecular structures compared to the normal molecular structures of healthy biological tissue.

Figure 1:
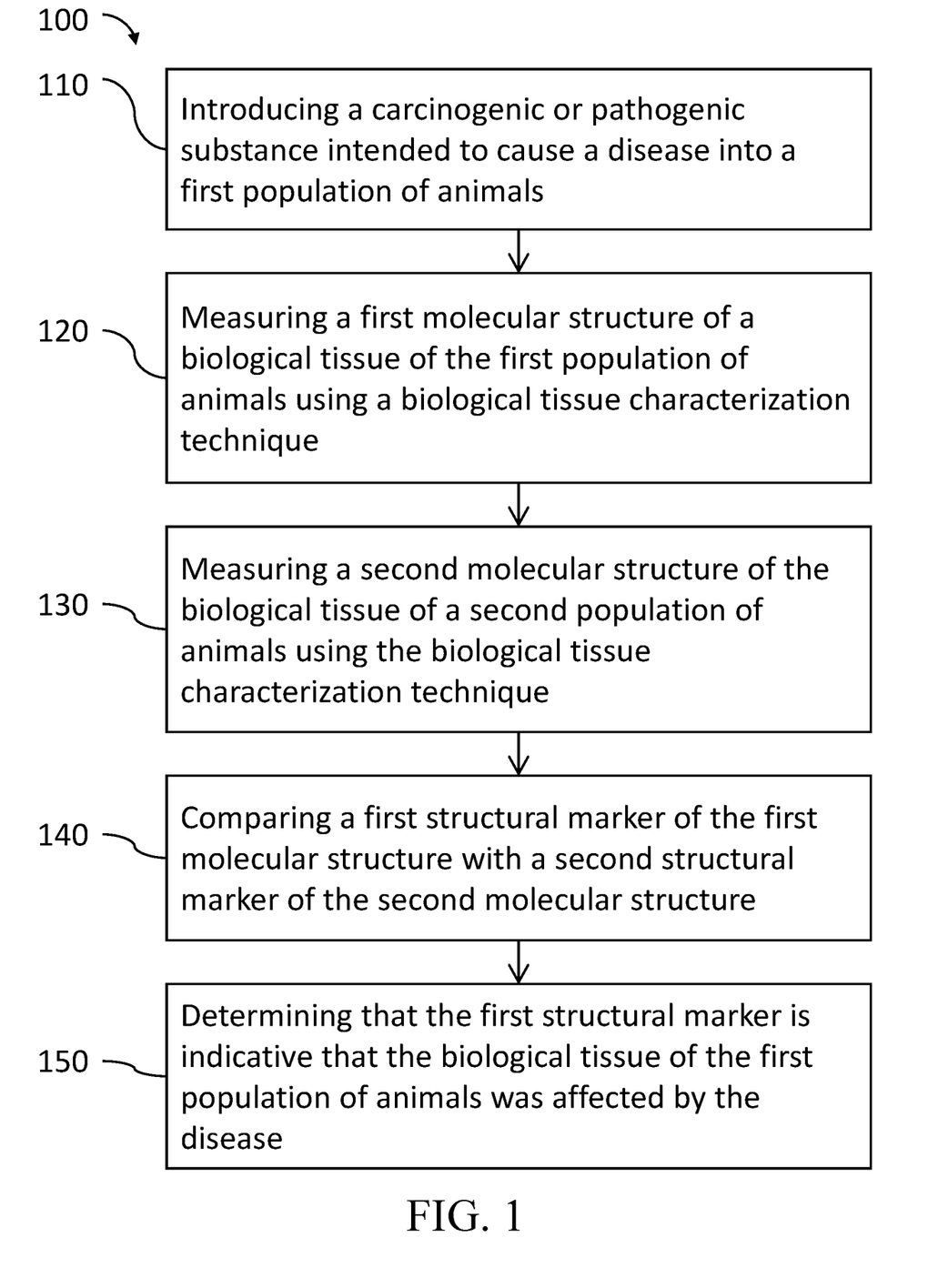
FIG. 1 is a flowchart of an example of a method for determining a structural marker for diagnosis of a disease, in accordance with some embodiments.

FIG. 1 is a flowchart of an example of a method 100 for determining a structural marker for a diagnosis of a disease in a population of animals including the following blocks. In block 110, a carcinogenic or pathogenic substance intended to cause a disease is introduced into a first population of animals. The carcinogenic or pathogenic substance intended to cause the first population of animals to contract the disease, however, in some cases some animals in the first population of animals will contract the disease and some will not. The disease can affect a molecular structure of a biological tissue of the first population of animals. In block 120, a first molecular structure of the biological tissue of the first population of animals is measured using a biological tissue characterization technique. The biological tissue characterization technique can be invasive or non-invasive, and performed in vivo or in vitro (using tissue samples). At block 130, a second molecular structure of the biological tissue of a second population of animals is measured using the biological tissue characterization technique, wherein the carcinogenic or pathogenic substance was not introduced into the second population of animals. At block 140, a first structural marker of the first molecular structure is compared with a second structural marker of the second molecular structure. The first structural marker can be determined from a measured feature of the first molecular structure of the biological tissue of the first population of animals, and the second structural marker can be determined from a measured feature of the second molecular structure of the biological tissue of the second population of animals, as described herein. At block 150, it is determined that the first structural marker is indicative that the biological tissue of the first population of animals was affected by the disease. The identified structural marker can then be used to diagnose the disease in other subjects (e.g., patients in a clinical setting) using the biological tissue characterization technique.

The first and second structural markers of method 100 can include, for example, one or more of: a defect in the molecular structure of the biological tissue, a periodicity of fibrils in the biological tissue, a periodicity of collagen fibrils in the biological tissue, and/or a periodicity of keratin fibrils in the biological tissue. Defects in a molecular structure of a biological tissue can include a morphology that is defective (e.g., the morphology of a diseased tissue can be more amorphous while the morphology of a healthy tissue can be more crystalline), or a chemical composition that is defective (e.g., the chemical composition of a diseased tissue can be include different elements and/or different ratios of elements than that of healthy tissue). Such molecular structures of biological tissue can be observed, for example, using X-ray diffraction characterization techniques, and the structural markers can be determined from analysis of features of measured data (e.g., diffraction patterns). In general, the first structural marker can include any feature found in the measurement of the first molecular structure that is different from a corresponding measured feature of the second molecular structure.

In some embodiments, the methods disclosed herein include measuring (e.g., in blocks 120 and 130 of method 100 in FIG. 1) a molecular structure of biological tissue that diffracts X-ray light, such as a collagen, a keratin, and/or a glycoprotein.

In some embodiments, the biological tissue measured in the methods disclosed herein (e.g., in blocks 120 and 130 of method 100 in FIG. 1) include one or more of nails, hair, wool, horns, claws, breast tissue, brain tissue, skin, muscle tissue, fat, and car tissue. In some cases, tissue samples of nails, hairs, wool, horns, and/or claws are used for in vitro biological tissue characterization measurements, and the skin, muscles and/or cars are used for in vivo biological tissue characterization measurements.

In some embodiments, the biological tissue characterization technique of the methods disclosed herein includes one or more of: X-ray diffraction (e.g., using a tissue diffractometer comprising a two-dimensional pixel detector), luminescent spectroscopy, selective laser spectroscopy, Raman spectroscopy, spectroscopy in the visible spectral region (e.g., 400-740 nm), and infrared spectroscopy.

In some embodiments, the methods disclosed herein (e.g., in block 120 of method 100 in FIG. 1) the observation of the changes in the molecular structure of the biological tissue samples is implemented by a device such as X-ray tissue diffractometer comprising a two-dimensional pixel detector, luminescent spectroscope, selective laser spectroscope, Raman spectroscope, spectroscopy in the visible spectral region (400-740 nm), and infrared spectroscope. In some embodiments, one or more processors (or computers, or servers) are used to process data from the device. In some embodiments, the processed data can further be used by the one or more processors (or computers, or servers) to determine the structural marker.

The measurements of the molecular structure of the biological tissue of the groups (or populations) of animals at blocks 120 and 130 can produce sets of measurement data, which can be analyzed using statistics. For example, each measurement of the set of measurement data can be analyzed using a computer to produce a numerical metric, and the numerical metrics can be analyzed using statistics (e.g., to determine the mean, standard deviation, etc.). In the case of X-ray diffraction measurements, the metric represents (or describes) a measurement of a feature of the biological tissue, where the feature can include atomic periodicity, crystallinity, orientation of fibrils, or any feature in the produced X-ray diffraction measurements (or patterns). In some cases, such a metric can also be a structural marker of a disease. For example, an X-ray diffraction measurement (or pattern) can include a metric indicative of the periodicity of fibrils in the biological tissue, and that metric can be a structural marker for a disease that affects the periodicity of the fibrils in the biological tissue. In some cases, the biological tissue of some of the animals in the first population that contract the disease will be affected by the disease and the biological tissue of some of the animals in the first population will appear healthy. In some cases, the biological tissue of some of the animals in the first population that contract the disease will be affected by the disease more than the biological tissue of other animals of the first population of animals.

In some embodiments, the carcinogenic or pathogenic substance contains one or more of: acetaldehyde, 4-aminobiphenyl, aristolochic acid, plants containing aristolochic acid, asbestos, arsenic, arsenic compounds, azathioprine, benzene, benzidine, benzopyrene, beryllium, beryllium compounds, chlornaphazine, nitrogenous mustard gas, chloromethyl ether, methyl ether, 1,3-butadiene, 1,4-butanediol, cadmium, cadmium compounds, chlorambucil, methyl-CCNU, chromium (VI) compounds, cyclosporine, cyclophosphamide, diethylstilboestrone, Epstein-Barr virus, non-steroidal estrogens, steroid estrogens, crionite, ethylene oxide, etoposide, combination of etoposide with cisplatin and bleomycin, formaldehyde, bacterium, *Helicobacter Pylori* Hepatitis B virus, hepatitis C virus, melphalan, metoxalen in combination with ultraviolet A-radiation, 4,4'-methylene-bis-(o-chloraniline) (MOCA), mustard gas, 2-naphthylamine, neutron radiation, tobacco nitrosamine, 4-(N-methylnitrosamine)-1-(3-pyridyl)-1-butanone, N-nitrosonornicotine, opisthorchiasis, plutonium-239 and its decay products, and plutonium-240 and other isotopes. In some embodiments of the methods and systems described herein, the carcinogenic or pathogenic substance used can be a substance other than those in the list above.

In some embodiments of the methods and systems described herein, a structural marker (e.g., indicative of pathological changes in the molecular structure of the biological tissue of a patient sample) can be used in medical practice to identify a stage of a disease.

Figure 2:
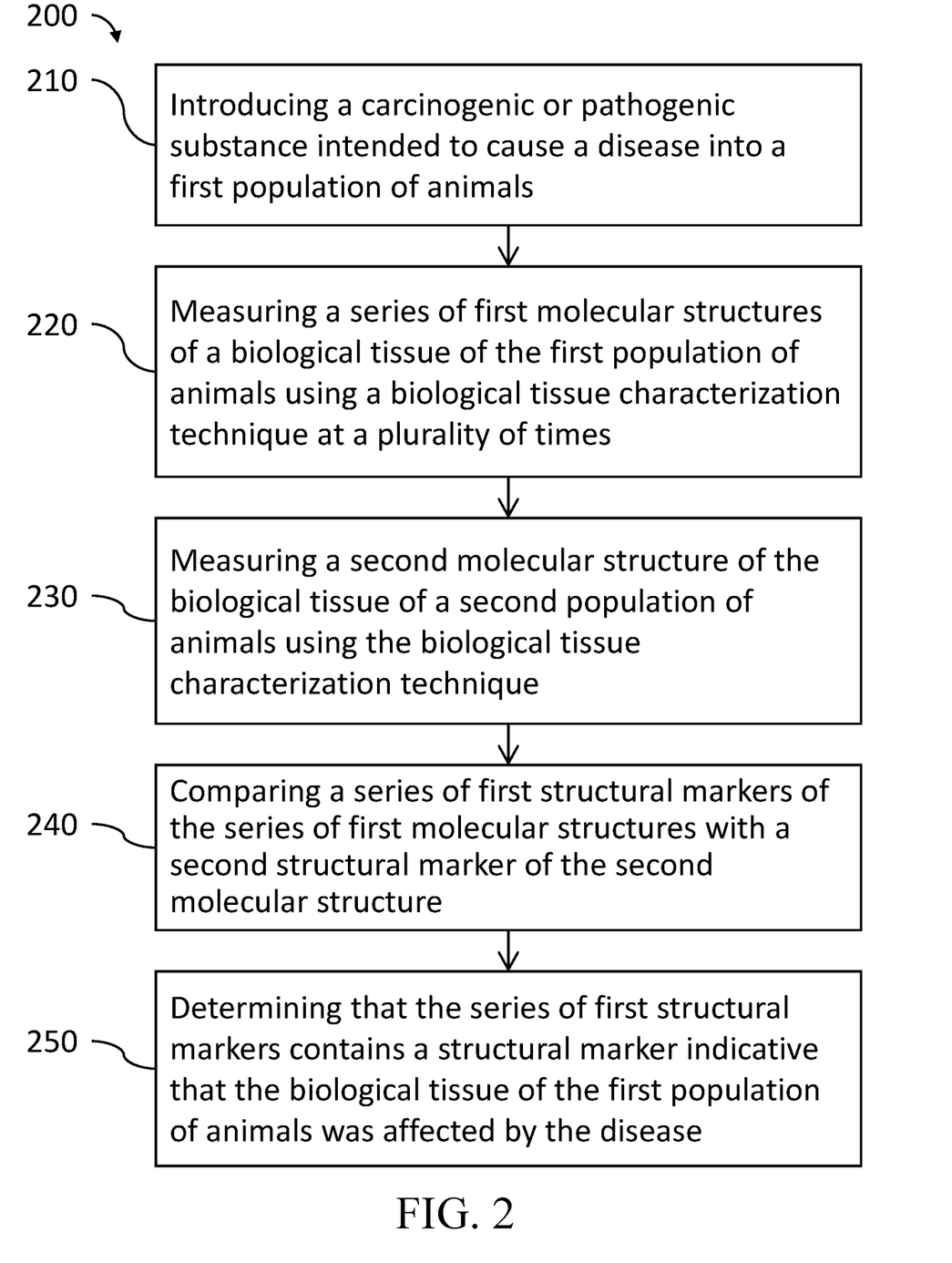
FIG. 2 is a flowchart of an example of a method for determining a structural marker for diagnosis of a disease, in accordance with some embodiments.

FIG. 2 is a flowchart of an example of a method 200 for determining a structural marker for a diagnosis of a disease in a population of animals including the following blocks. In block 210, a carcinogenic or pathogenic substance intended to cause a disease is introduced into a first population of animals. The carcinogenic or pathogenic substance intended to cause the first population of animals to contract the disease, however, in some cases some animals in the first population of animals will contract the disease and some will not. The disease can affect a molecular structure of a biological tissue of the first population of animals. In block 220, a series of first molecular structures of the biological tissue of the first population of animals is measured using a biological tissue characterization technique at a plurality of times (e.g., every day, every few days, once a week, once a month, or wherein the plurality of times are separated by a constant or variable time interval). The biological tissue characterization technique can be invasive or non-invasive, and performed in vivo or in vitro (using tissue samples). At block 230, a second molecular structure of the biological tissue of a second population of animals is measured using the biological tissue characterization technique, wherein the carcinogenic or pathogenic substance was not introduced into the second population of animals. At block 240, a series of first structural markers of the series of the first molecular structures is compared with a second structural marker of the second molecular structure. The series of first structural markers can be determined from a series of measured features of the series of the first molecular structures of the biological tissue of the first population of animals, and the second structural marker can be determined from a measured feature of the second molecular structure of the biological tissue of the second population of animals. At block 250, it is determined that the series of the first structural markers contains a structural marker indicative that the biological tissue of the first population of animals was affected by the disease. The identified structural marker can then be used to diagnose the disease in other subjects (e.g., patients in a clinical setting) using the biological tissue characterization technique.

For example, the disease in method 200 can progress over time, and the series of first structural markers (in block 240) can contain some structural markers that are indicative of healthy tissue and some structural markers that are indicative of diseased tissue. In such examples, the structural markers can be used to indicate the timing of progression or stages of the disease. In another example, a rate of change of the structural markers of the series of first structural markers can itself be a structural marker that is indicative of disease affecting (changing) the biological tissue of the first animal population. In such examples, the change in the value of a feature of the measurement data (e.g., X-ray diffraction data) can be the structural marker, and the absolute values of the feature (in different measurements) may or may not be significant. In some cases, at block 230, a series of second molecular structures of the biological tissue of the second population of animals can also be measured using the biological tissue characterization technique at a plurality of times, and a second series of structural markers can be compared to the first series of structural markers (at block 240) to determine a rate of structural change indicative of the disease (at block 250).

In some embodiments of method 200, the series of first molecular structures (at block 220) includes two or more measurements of the molecular structure of the biological tissue of the animal population at two or more times. In such cases in method 200, changes in the molecular structure of the biological tissue can be observed using an algorithm to analyze the change in the molecular structure over time (wherein the change can include no change, or no significant change). For example, the algorithm can analyze the measurement data to determine the change in the molecular structure after each successive measurement. The output from the algorithm indicating the change in molecular structure over time can be used to determine a structural marker of the biological tissue. In cases where a series of measurements are taken, the "first time" in method 200 can correspond to the first measurement in the series of measurements (either before or after introducing the carcinogenic or pathogenic substance), or the "first time" in method 200 can correspond to a measurement other than the first measurement in the series of measurements. Additionally, when a series of measurements are taken, the first time and the second time can be consecutive or non-consecutive measurements.

In method 200, measurements of the molecular structure of the biological tissue can be taken at various times before, during and after the introduction of the carcinogenic or pathogenic substance into the first population of animals. The data from the measurements can be analyzed after each successive measurement or at selected intervals using a multi-step algorithm. In some cases, the multi-step algorithm includes statistical analyses to determine the change of the molecular structure of the biological tissue in method 200 (e.g., after each measurement). In some cases, more than one measurement can be taken at a particular time (e.g., on the same day, or in a single measurement session, or of each member of the group or population), for example, to provide more data for statistical analyses. In some cases, the statistical analyses can include fitting measured data to a function (e.g., a linear function, a polynomial function, an exponential function, or a logarithmic function) to determine the change of the molecular structure of the biological tissue. In this process, regression coefficients of the fitted functions can be determined using the statistical analyses. In some cases, comparison of regression coefficients of functions that have been fit to the measured data using multiple measurements can improve the statistical significance of an observed change of the molecular structure of the biological tissue over time. In some cases, the statistical analyses may include a determination of a pair-wise distance distribution function, a determination of a Patterson function, a calculation of a Porod invariant, a Fourier transformation, a cluster analysis, a dispersion analysis, a determination of one or more molecular structural periodicities, or any combination thereof. In some cases, the multi-step algorithm can analyze the clustering of data (e.g., derived from the analysis of image data, diffraction data, subject data, or any combination thereof) and re-evaluate observed changes in sample data characteristics and clustering over time. In some cases, the multi-step algorithm can plot data points in an n-dimensional space defined by two or more parameters of a study (e.g., a degree of crystallinity of a molecular structure, time, population, etc.) and analyze the data for changes in the molecular structure. For example, the distance or changes in distance between data points or clusters of data points may be calculated as a function of time. In some instances, the proximity of a new data point to the previous data point(s), or the trajectory of certain data clusters (or the gradient of the trajectory) can describe the observed change in the molecular structure of the biological tissue over time. These factors may be used to develop structural markers that are indicators of diseases.

In some embodiments, the methods disclosed herein include using a computer workstation to control a characterization device performing the biological tissue characterization (e.g., in vivo or in vitro), such as one or more spectroscopes and/or an X-ray tissue diffractometer. In some cases, the mechanisms and motors of the characterization device, and/or analysis and storage of data from the characterization device (e.g., digital image processing, storing and displaying data received from the two-dimensional pixel detector) can also be performed using the computer workstation. For example, digital image processing can include discrete two-dimensional Fourier transform of images, image segmentation, definition of descriptors of boundaries and regions, and/or recognition of objects within one or more images.

The methods described herein can further include digital image processing of one or more images related to the molecular structure of the biological tissue (e.g., measurement data from the biological tissue characterization technique) which can also be performed using the computer workstation. For example, the digital image processing can include one or more of: producing a discrete two-dimensional Fourier transform of the one or more images, performing image segmentation of the one or more images, defining descriptors of boundaries or regions in the one or more images, and recognizing objects in the one or more images. The method can further include storing and displaying data received from the characterization device performing the one or more characterization techniques.

Figure 3A:
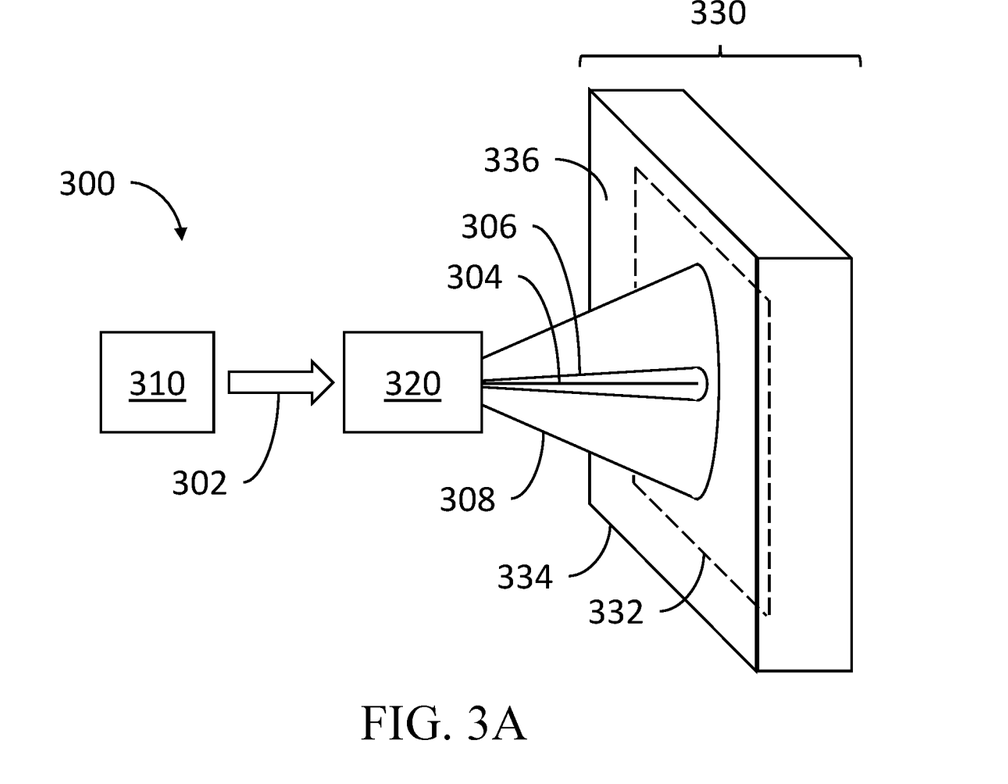
FIGS. 3A and 3B show examples of X-ray tissue diffractometers, in accordance with some embodiments.
Figure 3B:
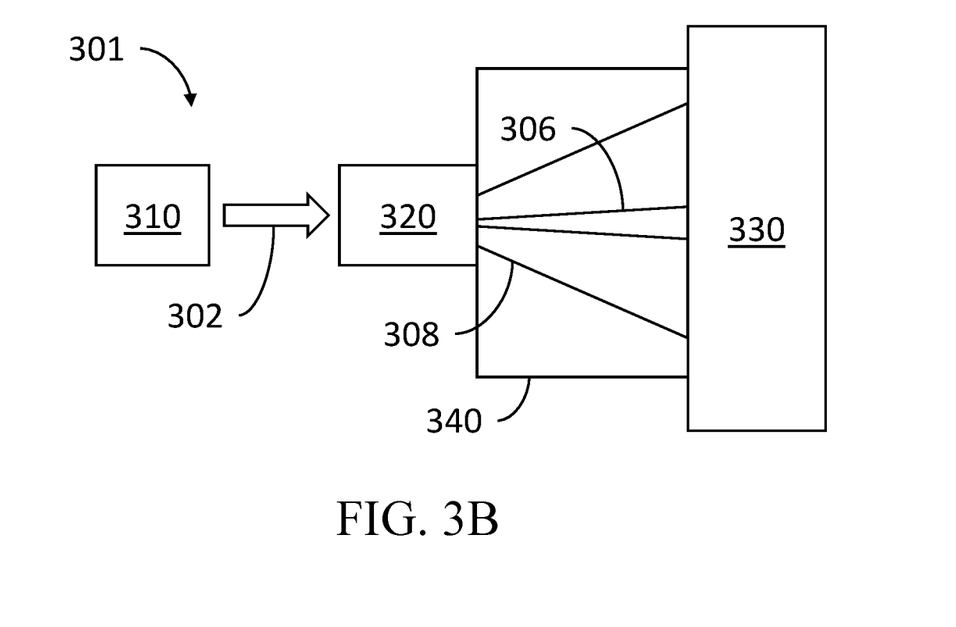

In some embodiments, the biological tissue characterization technique of the methods disclosed herein is X-ray diffraction, and the measurements are performed using an X-ray tissue diffractometer. FIGS. 3A and 3B show examples of X-ray tissue diffractometers 300 and 301 that can be used to perform the methods disclosed herein, including in vivo and in vitro measurements.

FIG. 3A shows a simplified schematic of an example of an X-ray tissue diffractometer 300 including: a positioning area 320 for the biological tissue, an X-ray beam delivery system 310 and a receiver 330. The X-ray beam delivery system 310 provides a primary incident micro-beam of X-rays 302 directed at the biological tissue to be analyzed (the biological tissue being held in positioning area 320). The X-ray beam delivery system 310 can include a radiation source operating in continuous mode, an apparatus forming X-ray micro-beam, at least one monochromator, and at least one collimating and focusing optical device. The receiver 330 can include a two-dimensional pixel detector 332 designed to detect the transmitted micro-beam of X-ray 304 passed through the analyzed biological tissue as well as part or all X-rays 306 and 308 that are diffracted by the biological tissue. X-rays 306 are small-angle x-ray scattering (SAXS) signals, and X-rays 308 are wide-angle x-ray scattering (WAXS) signals, both of which can be detected using receiver 330. In some cases, the two-dimensional pixel detector 332 can be inside a protection container 334 that contains a vacuum (or low pressure) environment or is filled with an inert gas (e.g., neon or helium), and includes a window or wall 336 facing the biological tissue that is substantially transparent to X-rays.

FIG. 3B shows another simplified schematic of an example of an X-ray tissue diffractometer 301, which further comprises a chamber 340 filled with an inert gas (e.g., neon or helium). Chamber 340 is located between the receiver 330 and the positioning area 320 for the biological tissue in a working state (e.g., during the X-ray diffraction characterization of the molecular structure of the biological tissue). In some cases, the chamber 340 can be moveable, and can be moved into a different position in a non-working state. In some cases, receiver 330 can also include two-dimensional pixel detector 332, and chamber 334 with window or wall 336 that is substantially transparent to X-rays.

Figure 4:
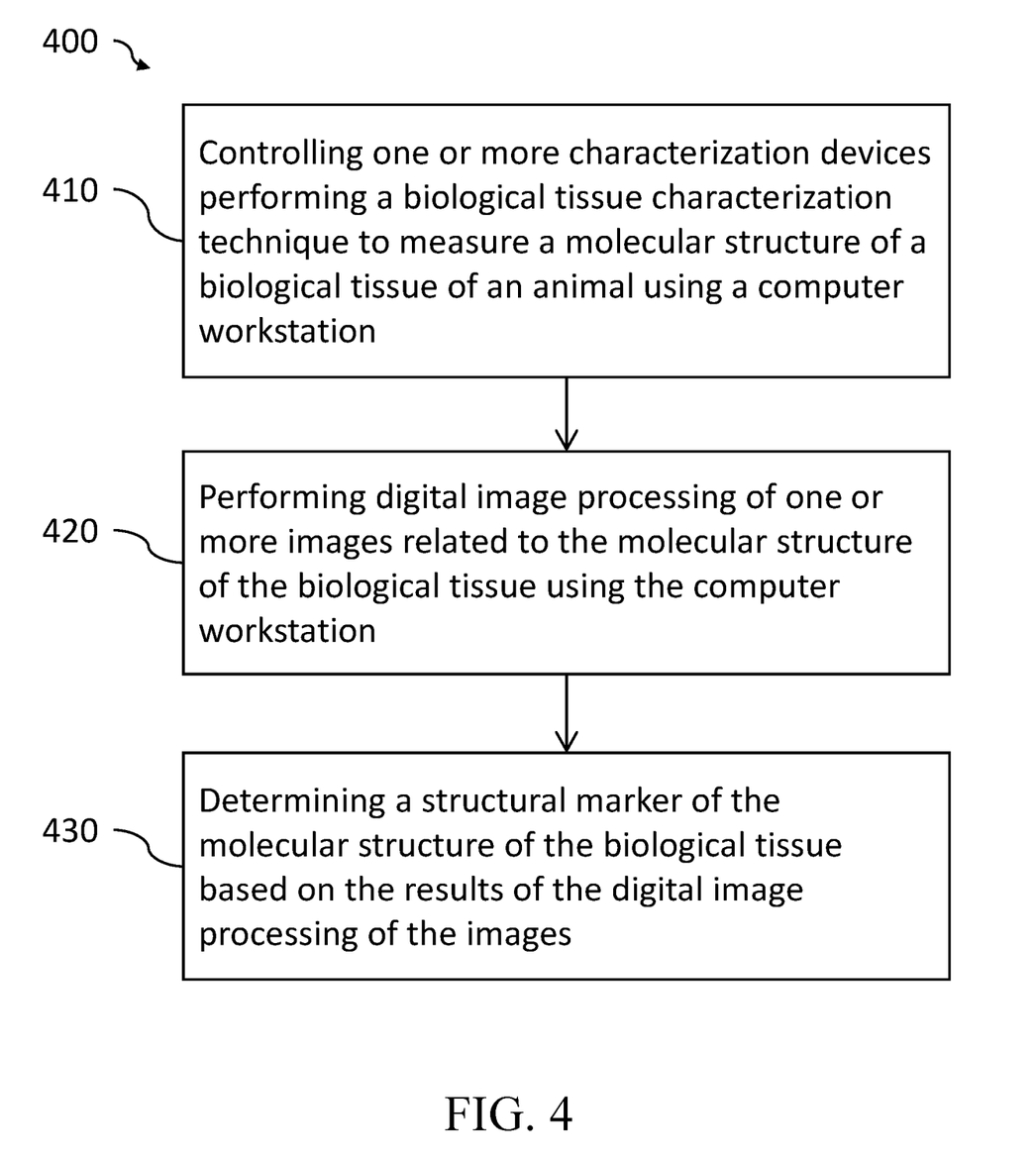
FIG. 4 is a flowchart of an example of a method for determining a structural marker for diagnosis of a disease, in accordance with some embodiments.

FIG. 4 is a flowchart of an example method 400 for determining a structural marker for a diagnosis of a disease in a population of animals including the following blocks. In block 410, one or more characterization devices performing a biological tissue characterization technique (e.g., in vivo or in vitro) are controlled to measure a molecular structure of a biological tissue of an animal (of the population of animals described in methods 100 and 200 in FIGS. 1 and 2) using a computer workstation (or computer processor, or computer, or server). In block 420, digital image processing of one or more images related to the molecular structure of the biological tissue are performed using the computer workstation (or computer processor, or computer, or server). In block 430, a structural marker of the biological tissue is determined based on the results of the digital image processing of the images. Block 430 of method 400 can be performed wholly or partially by a computer workstation (or computer processor, or computer, or server). For example, a computer processor can process data from a characterization technique in block 430.

Blocks 410, 420 and 430 can be performed as part of method 100 in FIG. 1 and/or method 200 in FIG. 2. For example, block 410 can be performed as part of blocks 120 and 130 of method 100, and blocks 420 and 430 can be performed to determine the first and second structural markers after blocks 120 and 130 and before block 140 in method 100. Similarly, block 410 can be performed as part of blocks 220 and 230 of method 200, and blocks 420 and 430 can be performed to determine the first and second structural markers after blocks 220 and 230 and before block 240 in method 200.

In some embodiments, the methods disclosed herein include monitoring a clinical response of the animal (e.g., using visualization and diagnostics), such as a general blood test, a biochemical analysis, and/or a urine analysis. In some cases, these clinical responses can provide an indication of the status of the animal using conventional means (e.g., if the animal is affected by a disease), which can be used in combination with the methods described herein to further diagnose the disease using alternative methods (e.g., for comparison with a diagnosis made using a structural marker). In some cases, information from the monitoring the clinical response can be used for comparative analysis and testing of the disclosed method, and can be used to further determine the structural marker for a disease (e.g., in combination with using the biological tissue characterization technique to observe changes in the molecular structure of the biological tissue).

The methods disclosed herein include methods for determining a structural marker for diagnosing a disease in an animal using a biological tissue characterization technique. The present methods are advantageous, since early diagnosis of various diseases, such as cancers, can be challenging. The present methods can advantageously address the issues with conventional techniques, using biological tissue characterization to directly determine a structural marker for diagnosing a disease.

Reference has been made to embodiments of the disclosed invention. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method for determining a structural marker for a diagnosis of a disease, the method comprising:
   introducing a carcinogenic or pathogenic substance into a first population of animals, wherein the carcinogenic or pathogenic substance is intended to cause the first population of animals to contract a disease that affects a molecular structure of a biological tissue of the first population of animals;
   measuring a first molecular structure of the biological tissue of the first population of animals, after the carcinogenic or pathogenic substance was introduced into the first population of animals, using a biological tissue characterization technique;
   measuring a second molecular structure of the biological tissue of a second population of animals using the biological tissue characterization technique, wherein the second population of animals did not receive the carcinogenic or pathogenic substance;
   identifying a first structural marker of the first molecular structure of the biological tissue of the first population of animals;
   identifying a second structural marker of the second molecular structure of the biological tissue of the second population of animals;
   comparing the first structural marker with the second structural marker; and
   determining that the first structural marker is indicative that the biological tissue of the first population of animals was affected by the disease.

2. The method of claim 1, wherein the biological tissue is one or more of collagens that diffract x-ray light, keratins that diffract x-ray light, lipids that diffract x-ray light, actin that diffracts x-ray light, myosin that diffracts x-ray light, and glycoproteins that diffract x-ray light.

3. The method of claim 1, wherein the biological tissue characterization technique comprises non-invasive observation of the molecular structure of the biological tissue of the first population of animals in vivo.

4. The method of claim 3, wherein the biological tissue comprises one or more of nails, hairs, wool, horns, and claws.

5. The method of claim 1, wherein the biological tissue characterization technique comprises in vitro observation of the molecular structure of a sample of the biological tissue of the first population of animals.

6. The method of claim 5, wherein the biological tissue comprises one or more of: nails, hair, wool, horns, claws, breast tissue, brain tissue, skin, muscle tissue, fat, and ear tissue.

7. The method of claim 1, wherein the biological tissue characterization technique comprises one or more of: X-ray diffraction, luminescent spectroscopy, selective laser spectroscopy, Raman spectroscopy, spectroscopy in the visible spectral region, and infrared spectroscopy.

8. The method of claim 7, further comprising:
controlling one or more characterization devices performing the biological tissue characterization technique using a computer workstation;
performing digital image processing of one or more images related to the molecular structure of the biological tissue using the computer workstation; and
storing and displaying data received from the one or more characterization devices performing the one or more characterization techniques.

9. The method of claim 8, wherein the digital image processing comprises one or more of: producing a discrete two-dimensional Fourier transform of the one or more images, performing image segmentation of the one or more images, defining descriptors of boundaries or regions in the one or more images, and recognizing objects in the one or more images.

10. The method of claim 7, wherein the X-ray diffraction uses an X-ray tissue diffractometer comprising:
a positioning area for the biological tissue;
an X-ray beam delivery system providing a primary incident micro-beam of X-rays directed at the biological tissue to be analyzed, wherein the X-ray beam delivery system comprises:
a radiation source operating in a continuous mode;
an apparatus forming the primary incident micro-beam of X-rays;
a monochromator; and
at least one of a collimating optical device and a focusing optical device; and
a receiver comprising a two-dimensional pixel detector designed to detect a transmitted micro-beam of X-rays passed through the biological tissue as well as part or all of X-rays that are diffracted by the biological tissue.

11. The method of claim 10, wherein the two-dimensional pixel detector is inside a protection container, wherein the protection container comprises a vacuum or an inert gas environment, and a window or wall facing the biological tissue that is substantially transparent to the X-rays.

12. The method of claim 11, wherein the inert gas environment comprises neon or helium.

13. The method of claim 10, wherein the X-ray tissue diffractometer further comprises a chamber filled with an inert gas wherein the chamber is located between the two-dimensional pixel detector and the tissue during an X-ray diffraction characterization of the molecular structure of the biological tissue.

14. The method of claim 13, wherein the inert gas environment comprises neon or helium.

15. The method of claim 1, wherein the disease comprises a disease of the immune system, a disease of the skin, a rheumatic disease, a urological disease, an endocrine disease, a disease of the veins, a disease of the lymph nodes, a disease of an endocrine organ, a disease of a mammary gland, a disease of a respiratory organ, a disease of a digestive organ, a disease of the heart, a disease of the blood vessels, a disease of the colon, a disease of the ear, a disease of the throat, a disease of the nose, or cancer.

16. The method of claim 15, wherein the cancer comprises cancer of the stomach, liver, rectum, colon, esophagus, pancreas, bladder, vagina, lung, oropharynx, nasopharynx, oral mucosa, tongue, skin, brain, thyroid, prostate, breast, cervix, and/or ovary.

17. The method of claim 1, wherein the first and second population of animals comprises one or more of: rabbits, guinea pigs, rats, white rats, gray rats, mice, white mice, gray mice, golden hamsters, and monkeys.

18. The method of claim 1, wherein the carcinogenic or pathogenic substance comprises one or more of: acetaldehyde, 4-aminobiphenyl, aristolochic acid, plants containing aristolochic acid, asbestos, arsenic, arsenic compounds, azathioprine, benzene, benzidine, benzopyrene, beryllium, beryllium compounds, chlornaphazine, nitrogenous mustard gas, chloromethyl ether, methyl ether, 1,3-butadiene, 1,4-butanediol, cadmium, cadmium compounds, chlorambucil, methyl-CCNU, chromium (VI) compounds, cyclosporine, cyclophosphamide, diethylstilboestrone, Epstein-Barr virus, nonsteroidal estrogens, steroid estrogens, erionite, ethylene oxide, etoposide, combination of etoposide with cisplatin and bleomycin, formaldehyde, bacterium, *Helicobacter Pylori* Hepatitis B virus, hepatitis C virus, melphalan, metoxalen in combination with ultraviolet A-radiation, 4,4'-methylene-bis-(o-chloraniline) (MOCA), mustard gas, 2-naphthylamine, neutron radiation, tobacco nitrosamine, 4-(N-methylnitrosamine)-1-(3-pyridyl)-1-butanone, N-nitrosonornicotine, opisthorchiasis, plutonium-239 and its decay products, and plutonium-240 and other isotopes.

19. The method of claim 1, further comprising:
measuring a series of molecular structures of the biological tissue of the first population of animals at a plurality of times using the biological tissue characterization technique; and
comparing a series of structural markers of the series of molecular structures of the biological tissue of the first population of animals with the second structural marker of the second molecular structure of the biological tissue of the second population of animals.

20. The method of claim 19, wherein the comparing the series of structural markers of the series of molecular structures of the biological tissue of the first population of animals with the second structural marker of the second molecular structure of the biological tissue of the second population of animals further comprises:
determining a regression coefficient of a function fit to data from the measurements of the series of molecular structures of the biological tissue of the first population of animals.

21. The method of claim 19, further comprising identifying a stage of the disease at one or more of the plurality of times.

22. The method according to claim 1, wherein the first structural marker comprises one or more of: a defect in the molecular structure of the biological tissue, a periodicity of fibrils in the biological tissue, a periodicity of collagen fibrils in the biological tissue, a periodicity of keratin fibrils in the biological tissue, and a feature of the first molecular structure that is different from a corresponding feature of the second molecular structure.

* * * * *